Nov. 4, 1941.         T. H. DUNIGAN         2,261,514
COMBINED DINING TABLE, FOOD WARMER, AND LAMP
Filed July 5, 1939
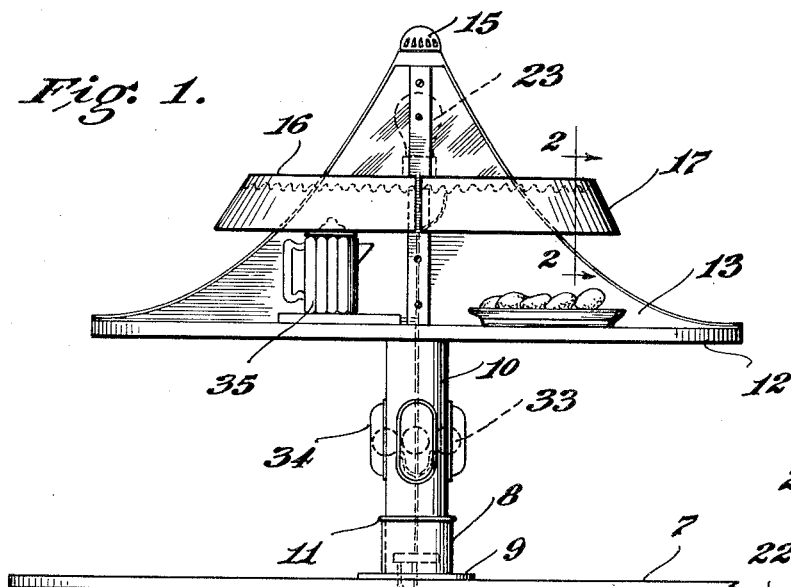
Fig. 1.
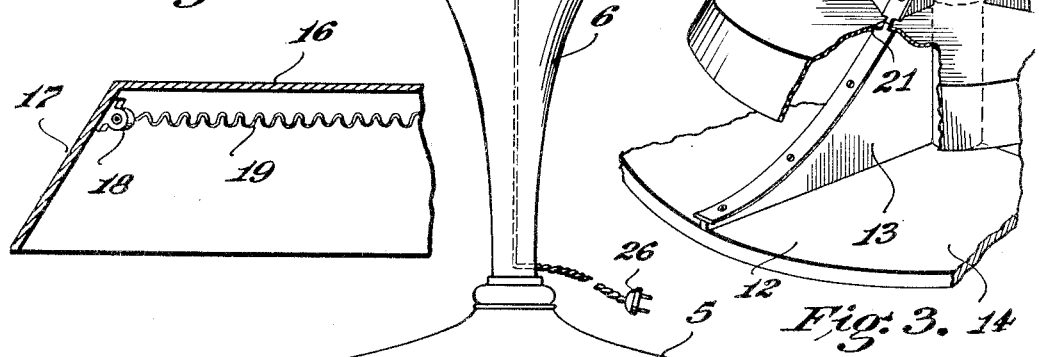
Fig. 2.
Fig. 3.
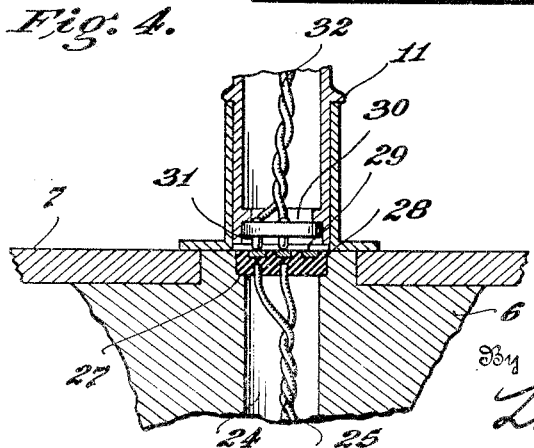
Fig. 4.
Inventor
THOMAS H. DUNIGAN
By Lacey & Lacey, Attorneys Patented Nov. 4, 1941

2,261,514

UNITED STATES PATENT OFFICE 2,261,514

COMBINED DINING TABLE, FOOD WARMER, AND LAMP

Thomas Henry Dunigan, Benton Harbor, Mich.

Application July 5, 1939, Serial No. 282,865

2 Claims. (Cl. 219—19)

This invention relates to dining tables and more particularly to a combined dining table, food warmer and lamp.

The object of the invention is to provide a combined device of the character described which is simple and inexpensive of construction and by means of which different articles of food may be supported in a convenient position for serving.

A further object of the invention is to provide a dining table having an auxiliary table mounted for rotation thereon and provided with a heating element for keeping food warm and palatable until ready to serve.

A further object is to provide the pedestal of the warming table with a plurality of incandescent bulbs for illuminating the serving table and a master light on the upper end of said pedestal for diffusing light over the articles of food on the warming table.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation of a combined dining table, food warmer and lamp embodying the present invention, Figure 2 is an enlarged vertical sectional view of the heating canopy, Figure 3 is a detail perspective view of the warming table, parts being broken away to more clearly show the construction of the dividing partitions and connecting straps, and Figure 4 is a detail vertical sectional view showing the conductors and electric switch within the pedestal.

The improved device forming the subject-matter of the present invention comprises a base or support 5 adapted to rest on the floor or, if desired, may be supported on the upper surface of any standard dining table. The base 5 is provided with a pedestal 6 and secured to the upper end of the pedestal is a serving table, indicated at 7. The serving table 7 is preferably circular in contour, and projecting vertically therefrom is a tubular member or sleeve 8, the lower end of which is formed with a lateral flange 9 which is secured to the upper surface of the serving table by screws or similar fastening devices. Rotatably mounted within the sleeve 8 is a hollow pedestal 10 provided with an exterior circumferential shoulder 11 which bears against the upper end of the sleeve 8 and serves to sustain the weight of the pedestal and its associated parts, while at the same time permitting said parts to rotate with respect to the serving table 7. Mounted on the upper end of the pedestal 10 for rotation therewith is a warming table 12 provided with a series of spaced radiating partitions 13 dividing said warming table into a series of independent compartments 14 adapted to receive different articles of food and keep the food warm and palatable until ready to serve on the table 7. The partitions 13 are substantially triangular in shape, as shown, and extend from the outer edge of the warming table 12 to the apex or cap 15 of the warming table. Arranged above the warming table is a canopy 16 provided with a depending outwardly flared flange 17, the inner surface of which is provided with spaced brackets 18 for supporting a heating element preferably in the form of a resistance wire 19, which wire extends entirely around the canopy 16 so as to keep the articles of food supported on the table 12 at the proper temperature until ready to serve. Secured to the outer edges of the partitions 13 are reinforcing strap irons 20 having their upper ends secured to the cap 15 and their intermediate portions provided with oppositely disposed notches defining connecting lips 21 which fit into correspondingly shaped notches formed in the canopy 16 thereby to securely hold the several parts firmly together. Interposed between the strap irons 20 are strips of isinglass or other transparent material 22 which form a housing for a master incandescent bulb 23 disposed at the upper end of the pedestal.

The pedestal 6 of the dining table 7 is preferably hollow, as indicated at 24, and extending within said pedestal are electric conductors 25, the lower ends of which are connected with a suitable switch 26 for attachment to a floor or wall socket in the usual manner. The upper end of the pedestal 6 is cut-away to form an annular seat 27 in which is fitted a block of insulating material 28, and embedded in said insulating block are spaced contacts 29 operatively connected to the conductors 25. Disposed within the lower end of the hollow pedestal 10 is a block of insulating material 30 having spaced contact pins 31 depending therefrom and operatively connected with electric conductors 32 leading to the master lamp 23. Operatively connected with the conductors 32 are a plurality of incandescent lamps 33, preferably four in number as shown, and which service to illuminate the articles of food on the dining table 7, said incandescent lamps 33 being housed and protected by means of glass cover plates 34 secured to the pedestals 10, as shown. These lights may be of any desired color but are preferably red, white and blue so as to give a neat ornamental appearance to the table as a whole.

The resistance wire 19 is operatively connected with the electric conductors 32 so that, when the current is on, the lights will be illuminated and the heating element 19 actuated to heat the articles on the warming table. If desired, an electric coffee percolator 35 may be operatively connected with the conductors 32 for the purpose of keeping coffee hot until ready to serve.

In operation, the different articles of food are placed on the warming table 12 and in which position they are kept at the desired temperature by the heating element 19. When it is desired to serve any particular article of food, the pedestal 10 is given a quarter turn so as to bring the selected article of food on the warming table in position to be conveniently removed therefrom and placed on the dining table 7 and this partial revolution of the warming table is continued until the desired number of articles of food have been removed from the warming table for serving on the dining table. As the pedestal 10 revolves, the contact pins 31 by engagement with the contact plates 29 will allow the current to pass from the switch 26 through the conductors 32, to the various lights and also to the heating element so that not only is the food kept warm until ready to serve but the electric lights will illuminate both the dining and warming tables and give the device a neat attractive appearance.

It will, of course, be understood that the devices may be made in different sizes and shapes and provided with any desired number of food compartments and incandescent lamps without departing from the spirit of the invention.

Having thus described the invention, what is claimed as new is:

1. In an article of the character described, a serving table, a warming table rotatably mounted over the serving table, an upright at the center of the warming table, partitions extending radially from the upright with their lower edges resting upon the warming table, said partitions having their outer side edges sloping upwardly towards the upright, a canopy carried by and extending outwardly from the partitions in vertical spaced relation to the warming table and having a depending outwardly flaring flange about its outer periphery, a resistance wire extending about the periphery of the canopy and located under the same adjacent the flange and constituting a heating unit for sections of the heating table defined by the partitions and also a lighting unit for illuminating articles placed in the sections of the heating table, and means for supplying current to the resistance wire.

2. In an article of the character described, a serving table, a warming table rotatably mounted over the serving table, an upright at the center of the warming table, partitions extending radially from the upright with their lower edges resting upon the warming table and their upper portions projecting above the upright, said partitions having their outer side edges sloping inwardly towards their upper ends, a canopy surrounding the upright at the upper end thereof and extending outwardly beyond the outer side edges of the partitions in vertical spaced relation to the warming table and provided with a depending flange about its outer periphery, a resistance under the canopy adjacent the outer periphery thereof constituting a heating unit and a lighting unit, a cap carried by the upper ends of the partitions over the upright, a bulb carrying socket at the upper end of the upright, transparent sheets extending between the canopy and the cap and detachably secured along their side edges to edges of the partitions above the canopy and together with the upper portions of the partitions and the cap defining a chamber for a light bulb carried by the socket, and means for supplying current to the resistance wire and the socket.

THOMAS HENRY DUNIGAN.